United States Patent

[11] 3,604,057

| [72] | Inventor | Frank S. Nixdorff, Jr.<br>Baltimore, Md. |
|---|---|---|
| [21] | Appl. No. | 837,610 |
| [22] | Filed | June 30, 1969 |
| [45] | Patented | Sept. 14, 1971 |
| [73] | Assignee | Anchor Hocking Corporation<br>Lancaster, Ohio |

[54] MIXING-METERING DEVICE FOR AN INJECTION MOLDING MACHINE
15 Claims, 9 Drawing Figs.

| [52] | U.S. Cl. | 18/30 FH,<br>18/30 FR, 222/137 |
|---|---|---|
| [51] | Int. Cl. | B29f 1/00 |
| [50] | Field of Search | 18/30 AS,<br>30 FH, 30 FR, 30 FM; 222/137 |

[56] References Cited
UNITED STATES PATENTS

| 1,956,460 | 4/1934 | Brown | 222/137 |
|---|---|---|---|
| 2,568,332 | 9/1951 | Genovese | 18/30 FH |
| 2,995,775 | 8/1961 | Schnitzius et al. | 18/30 FR |

FOREIGN PATENTS

| 1,018,894 | 10/1963 | Great Britain | 18/30 FH |

Primary Examiner—J. Spencer Overholser
Assistant Examiner—Lucius R. Frye
Attorney—Connolly and Hutz ABSTRACT: A mixing-metering device includes a pair of hoppers for supplying dissimilar free flowing granule materials through a pair of discharge openings to a collecting chamber. The collecting chamber includes two pairs of spaced filling openings with metering means arranged between the discharge and filling openings for simultaneously receiving metered amounts of the dissimilar materials from the discharge openings while simultaneously discharging metered amounts of the materials into the filling openings.

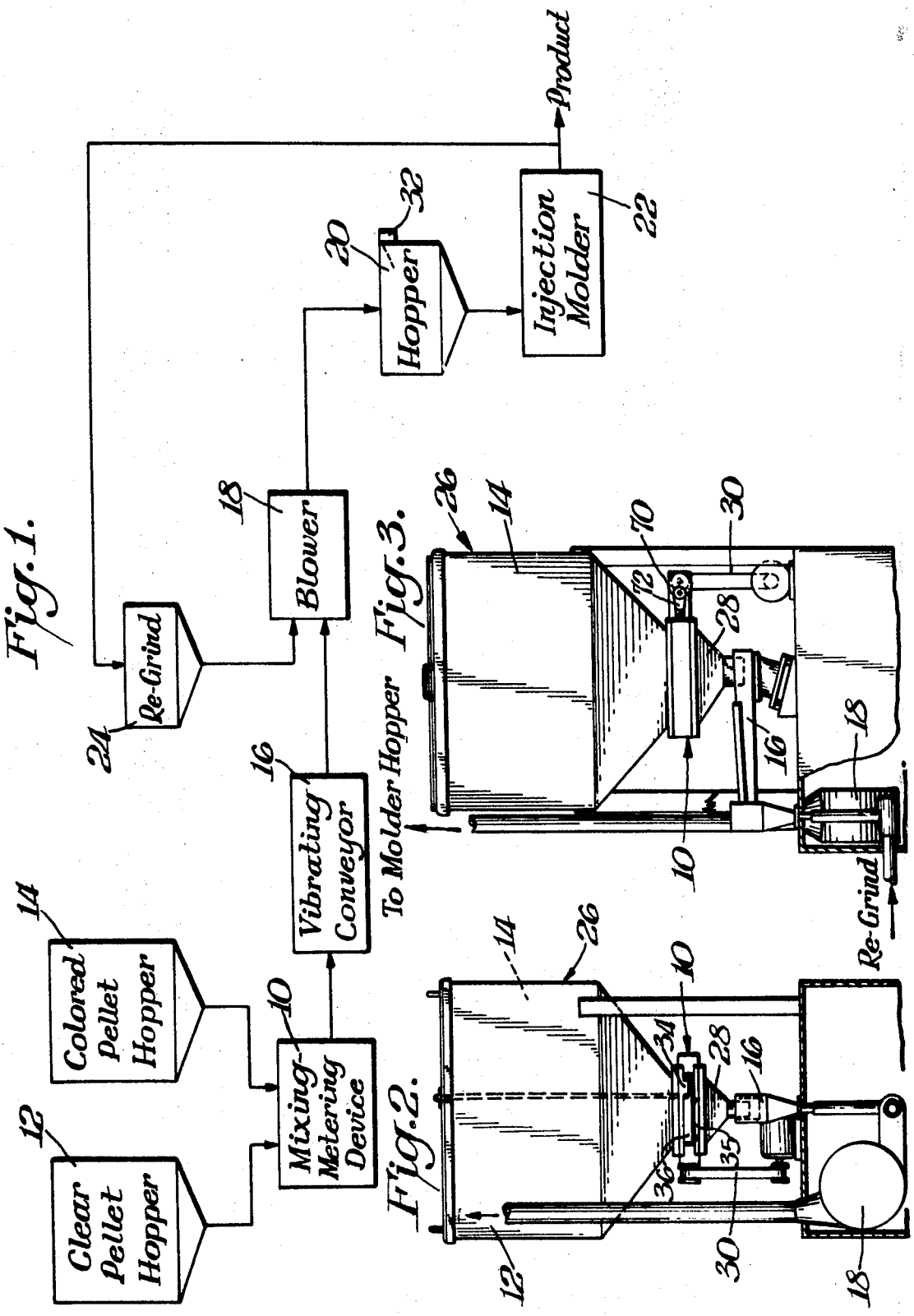

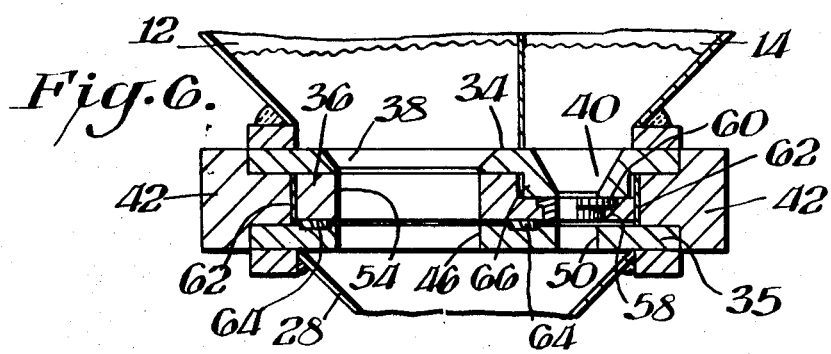
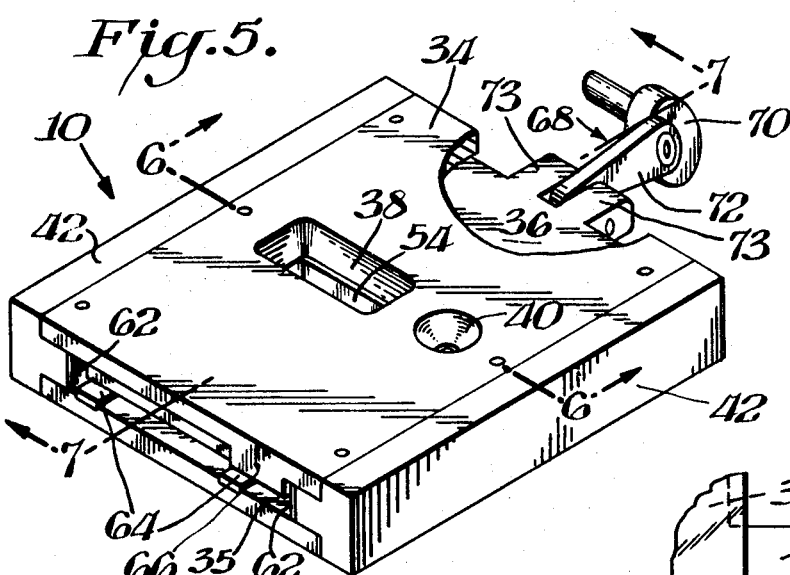
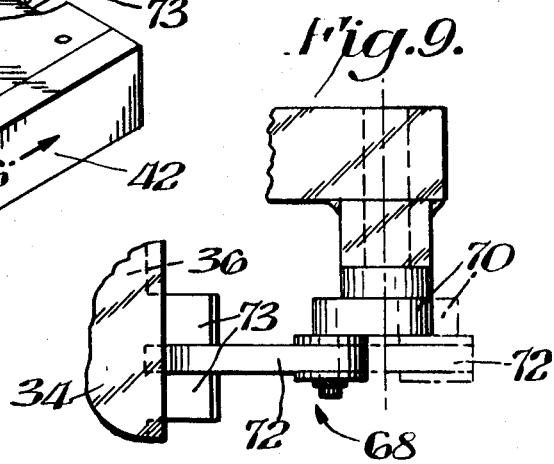
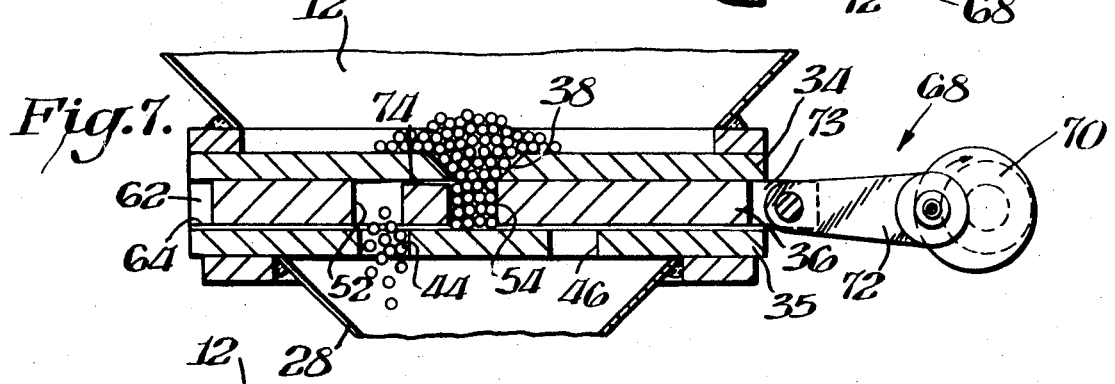
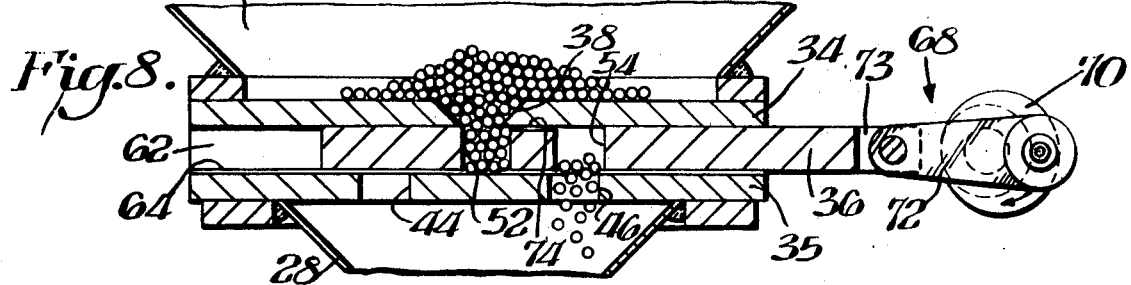

MIXING-METERING DEVICE FOR AN INJECTION MOLDING MACHINE

BACKGROUND OF INVENTION

This invention relates to a metering-mixing device for obtaining a homogeneous mixture of a plurality of dissimilar materials. Such devices have utility in a wide range of fields. For example a mixing device is required with injection molding machines for obtaining a desired color blend in the molded product, conventionally injection molding machines are provided with various means for mixing clear or natural granules with color concentrate granules If these dissimilar granules are not properly plasticized and mixed in the injection cylinder or extruder barrel a nonhomogeneous mixture can result which is evidenced by color streaking or mottling in the finished article.

Various mixing devices have been incorporated with injection molding machines in an effort to obtain a consistent homogeneous mixture of the natural and color concentrate granules or pellets. A common device in such machines is a feed screw or auger. Other arrangements, such as exemplified in U.S. Pat. No. 3,221,373 and British Pat. No. 1,018,894, include sliding metering device which receive the particles from a feed hopper and transport them to a mixing chamber. These devices, however, do not fulfill all the requirements of speed, economy and quality as is desired in mass production systems.

SUMMARY OF INVENTION

An object of this invention is to provide a mixing-metering device for producing a homogeneous mixture of a plurality of dissimilar materials.

A further object of this invention is to provide such a device which simultaneously discharges metered amounts of the materials while preparing further metered amounts for the next discharge.

A still further object of this invention is to provides such a device which minimizes the possibility of the materials being sheared during operation of the device.

A still further object of this invention is to provides such a device which is particularly suitable for use with an injection molding machine.

In accordance with this invention the mixing-metering device includes a pair of hoppers for supplying dissimilar free flowing granule material through a pair of discharge openings to a collecting chamber. The collecting chamber includes two pairs of spaced filling openings with metering means arranged between the discharge and filling openings for simultaneously receiving metered amounts of the dissimilar materials from the discharge openings while simultaneously discharging metered amounts of the materials into the filling openings.

The metering means may be a slide plate having metering pockets and which is reciprocated in such a manner by a crank device as to have uniform acceleration-deceleration dwell on each stroke thereof. Additionally, the slide plate may be arranged in such a manner with an injection molding machine that the actuation of the slide plate is controlled in accordance with the level of the blended granules in the feed hopper for the injection molding machine.

THE DRAWINGS

FIG. 1 is a schematic view of an injection molding machine incorporating the mixing-metering device of this invention;

FIGS. 2-3 are side and end elevation views of the mixing-metering device of this invention;

FIG. 5 is a perspective view of the arrangement shown in FIG. 4;

Figure 4:
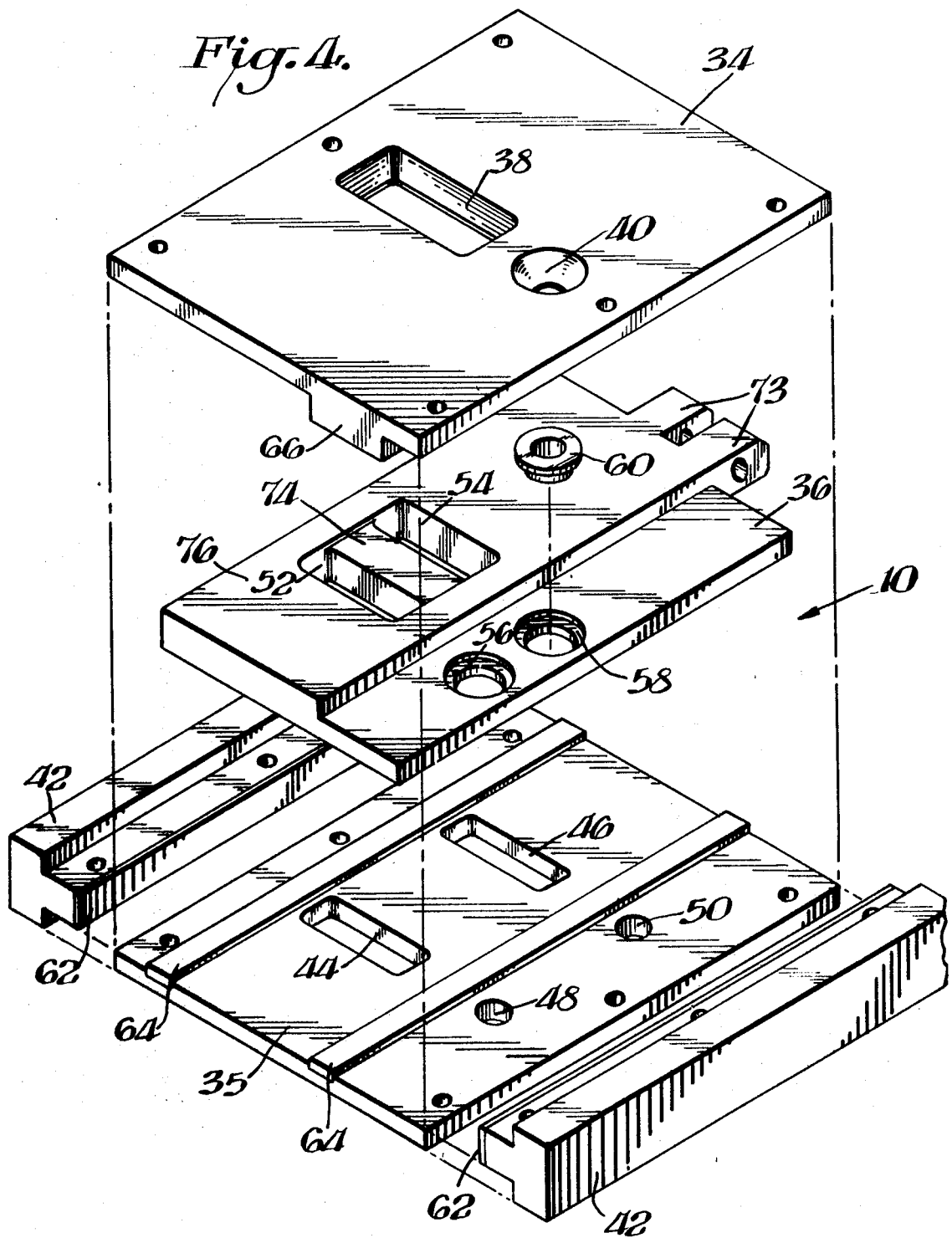
FIG. 4 is an exploded view of a portion of a mixing-metering device in accordance with this invention.

FIGS. 6 and 7 are cross-sectional views taken through FIG. 5 along the lines 6—6 and 7—7, respectively;

FIG. 8 is a view similar to FIG. 7 but in a different phase of operation; and

FIG. 9 is a plan view of a portion of the arrangement shown in FIGS. 5-8.

DETAILED DESCRIPTION

The mixing-metering device of this invention is described in an environment wherein it is utilized with an injection molding machine. It is to be understood, however, that the concepts of this invention may be applied to other fields where there is a desire to provide a consistent high quality homogeneous mixture of a plurality of materials. It is to be further understood that for the sake of clarity the mixing-metering device is described with respect to the mixing of two dissimilar free flowing granule materials. The concepts of this invention, however, may also be utilized for effectively mixing more than two materials.

As shown in FIG. 1 the mixing-metering device 10 receives both clear pellets or granules from hopper 12 and color concentrate granules from hopper 14. The granules are mixed and received upon vibrating conveyor 16 into blower 18 and then to hopper 20 where they are fed into injection molding machine 22. The waste material or flash from the finished product is reused by being fed to regrinder 24 and then into blower 18 where it is mixed with the fresh material. Since the regrind material is already of the proper color blend, its addition to blower 18 does not affect the color blend of the fresh material.

As indicated in FIG. 2 hoppers 12 and 14 are actually compartments of a divided hopper 26. Disposed beneath divided hopper 26 is a mixing chamber 28 which deposits the mixed or blended materials onto vibratory conveyor 16 (FIG. 3). The mixing-metering device 10 is disposed between hopper 26 and chamber 28 so that the dissimilar materials supplied from hopper 26 are received in chamber 28 in metered amounts whereby a homogeneous blending or mixture will be obtained. Mixing-metering device 10 includes a drive 30 which is actuated in accordance with the level of the mixed material in hopper 20. For example an operator may initiate the operation of mixing-metering device 10 which then continues to operate and until it is shut off automatically when the level of mixed material reaches a predetermined maximum in hopper 20 by the material contacting a conventional level indicating switch 32 which in turn inactivates drive 30. Of course a minimum level indicating switch may also be provided for complete automation of the mixing-metering device. Accordingly, as can be appreciated the utilization of the level of blended material in hopper 20 of the injection molding machine to control the actuation of mixing-metering device 10 very advantageously adapts the device 10 for use with the injection molding machine.

FIG. 4 is an exploded view of the mixing-metering device 10 which includes a top plate 34 secured to the bottom of hopper 26, a bottom plate 35 secured to the top of mixing chamber 28 and a intermediate slide plate 36. Top plate 34 is provided with a tapered filling opening 38 for feeding clear or natural pellets and with a tapered filling opening 40 for feeding color concentrate pellets. Top plate 34 is secured to the shoulders of side rails 42 which in turn is secured to lower plate 35. Lower plate 35 similarly includes a pair of discharge openings 44, 46 for receiving the clear pellets and a second pair of discharge openings 48, 50 for receiving the color concentrate pellets.

As also shown in FIG. 4 slide plate 36 includes a pair of metering pockets 52, 54 for the clear pellets and a second pair of metering pockets 56, 58 for the color concentrate pellets As later disclosed the size of these pockets may be varied by the insertion are suitable inserts or bushings 60 (only one of which is illustrated for the sake of clarity) where desired. Bearing surfaces 62, 64 are provided on the sidewalls of rails 42 and the top wall of plate 35 to facilitate the sliding action of plate 36. Top plate 34 includes a downwardly extending shoulder 66 which mates with the recessed upper portion of plate 36 to assure proper alignment thereof. Bearing surfaces 64 also serve to maintain a small amount of clearance between the lower surface of plate 36 and the upper surface of plate 35 to prevent pellets from being sheared by the moving upper plate.

Plate 36 is reciprocated by crank mechanism 68 which includes a rotating disk 70 and an eccentrically mounted crank arm 72 secured between projections or tongue 73 on plate 36.

The various pockets and openings are arranged in such a manner that the discharge openings 38, 40 are disposed half the distance between their respective filling openings 44, 46 and 48, 50 with the distance between pockets 52 and 54 and pockets 56 and 58 being also half the distance between the filling openings.

FIGS. 7 and 8 illustrate the operation of the mixing-metering device 10. As indicated for example in FIG. 7 when the pocket 54 is being filled by granules fed through discharge opening 38 a like metered amount of granules or pellets are simultaneously deposited from pocket 52 into chamber 28 through opening 44. Slide plate 36 is then returned to its previous position which is illustrated in FIG. 8 wherein pellets or granules are discharged from pocket 54 while pocket 52 is being filled. As shown in FIG. 6 while this simultaneous filling and discharge of the clear pellets takes place an identical filling and discharge of the color concentrate granules also takes place. This simultaneous discharge of metered amounts of two dissimilar materials into a common chamber promotes blending action while at the same time preparing metered amounts of the materials for successive discharge.

By use of the crank device 68 a uniform acceleration-deceleration dwell on each stroke of slide plate 36 is obtained to facilitate the accurate filling of the metering pockets in rapid succession. Additionally, the crank device and slide plate are arranged with respect to each other so that the metering pockets overstroke the filling and discharge openings on each cycle to assure repetitive accuracy in the filling of the metering pockets during reversal of the plate motion.

A further advantage of the mixing-metering device 10 is the inclusion of a connective channel 74 between pockets 52 and 54. This channel or cutout extends below the upper surface 76 of plate 36 a depth approximately equal to the size of the granule being metered. Accordingly, the connective channel 74 prevents shearing of the granules when the metering pockets pass the filling opening 38. Since device 10 is illustrated in an environment with an injection molding machine the various opening and pocket capacity or size for the clear granules with respect to the color concentrate granules is made in the preferable arrangement of about 10:1. As previously indicated, however, this ratio can be varied by the use of bushings or inserts 60 (FIG. 4). Additionally, since substantially more of the clear granules are being fed than the color concentrate granules, the problem of shearing the granules is more acute with the larger quantity clear pellets and thus a connective channel 74 is particularly desirable for the clear pellets although not as necessary with the smaller volume color concentrate pellets.

As can be appreciated mixing-metering device 10 can be incorporated in arrangements other than an injection molding machine. Moreover, three or more different materials can be simultaneously mixed with a device such as mixing-metering device 10 by providing the appropriate number of discharge slots or openings, metering pockets and filling openings therein.

What I claim is:

1. A mixing-metering device for obtaining a homogeneous mixture of a plurality of materials comprising a first hopper for supplying a first free flowing granular material, a second hopper for supplying a second dissimilar free flowing granular material, a collecting chamber, said chamber having a first pair of spaced material filling openings, said first hopper having a material discharge opening disposed between said first pair of material filling openings, said chamber further having a second pair of spaced material filling openings, said second hopper having a material discharge opening disposed between said second pair of spaced material filling openings, and metering means between said discharge openings and said filling openings for simultaneously receiving metered amounts of the dissimilar materials from said discharge openings while discharging metered amounts of the dissimilar materials into said filling openings; in combination therewith, an injection molding machine, a mixture hopper communicating with said injection molding machine, and means for transporting the mixed materials from said collecting chamber to said mixture hopper.

2. A device as set forth in claim 1 wherein said metering means includes a slide plate having metering pockets for selective communication with said discharge and filling openings, and drive means for reciprocating said slide plate.

3. A device as set forth in claim 2 wherein said drive means is connected to said slide plate for causing uniform acceleration-deceleration-dwell on each stroke thereof to facilitate the accurate filling of said pockets.

4. A device as set forth in claim 3 wherein said drive means is connected to said slide plate in such a manner as to provide an overstroke of said pockets with respect to said discharge and filling openings.

5. A device as set forth in claim 4 wherein said drive means includes a rotatable disk, and a crank arm eccentrically connected to said disk and connected to said slide plate.

6. A device as set forth in claim 5 wherein said slide plate includes two pairs of said metering pockets, a connective channel being provided between the pockets of at least one of said pairs and being of sufficient size to accommodate the granular material and prevent shearing thereof.

7. A device as set forth in claim 6 wherein each discharge opening is disposed between its respective openings a distance of about one-half the distance between said filling openings, and the distance between its pair of metering pockets being about one-half the distance between said filling openings.

8. A device as set forth in claim 7 including means for adjusting the capacity of said metering pockets.

9. A device as set forth in claim 2 wherein said slide plate includes two pairs of said metering pockets, a connective channel being provided between the pockets of at least one of said pairs of metering pockets and being of sufficient size to accommodate the granular material and prevent shearing thereof.

10. A device as set forth in claim 9 wherein each discharge opening is disposed between its respective openings a distance of about one-half the distance between said filling openings, and the distances between its pair of metering pockets being about one-half the distance between said filling openings.

11. A device as set forth in claim 2 including regrind means for grinding waste material from said injection molding machine, and said regrind means communicating with said means for transporting the mixed materials from said chamber.

12. A device as set forth in claim 12 wherein said first hopper and said second hopper comprise compartments in a single hopper.

13. A device as set forth in claim 12 including level indicating switch means in said material hopper for controlling the actuation of said slide plate.

14. A device as set forth in claim 13 wherein drive means is connected to said slide plate for causing uniform acceleration-deceleration dwell on each stroke thereof to facilitate the accurate filling of said pockets and to provide an overstroke of said pockets with respect to said filling and discharge openings, said drive means including a rotatable disk, a crank arm eccentrically connected to said disk and connected to said sliding plate, said pockets comprising two pairs of pockets for each discharge opening, a connective channel being provided between the pockets in one of the pairs and being of sufficient size to accommodate the materials therein and prevent shearing thereof, each discharge opening being located midway between its respective pair of filling openings, and the distance between each pair of pockets being about half the distance between its pair of filling openings.

15. A device as set forth in claim 14 wherein the capacity of each pocket in one of said pockets is about 10 times greater than the capacity of each pocket in the other pair of pockets, and means for varying the capacity of at least one pair of pockets.

PO-1050
(5/69)

UNITED STATES PATENT OFFICE
CERTIFICATE OF CORRECTION

Patent No. 3,604,057          Dated September 14, 1971

Inventor(s) Frank S. Nixdorff, Jr.

It is certified that error appears in the above-identified patent and that said Letters Patent are hereby corrected as shown below:

Column 1, line 25, "device" should be --- devices ---

Column 1, line 38, "provides" should be --- provide ---

Column 1, line 41, "provides" should be --- provide ---

Column 1, line 56, "dwell" should be ---
                                                 -dwell ---

Column 2, line 64, after "pellets" insert
    --- . ---

Column 3, line 26, "dwell" should be
                                        --- -dwell ---

Column 4, line 43, "distances" should be
                                        --- distance ---

Column 4, line 50, "12" should be --- 11 ---

Column 4, line 58, "dwell" should be
                                        --- -dwell ---

Signed and sealed this 9th day of May 1972.

(SEAL)
Attest:

EDWARD M. FLETCHER, JR.          ROBERT GOTTSCHALK
Attesting Officer                    Commissioner of Patents